(12) United States Patent
Ziskind et al.

(10) Patent No.: US 11,812,069 B2
(45) Date of Patent: Nov. 7, 2023

(54) SYSTEM AND METHOD FOR LIVE STREAM CONTROL

(71) Applicant: Fox Corporation, New York, NY (US)

(72) Inventors: Ben Ziskind, Carlsbad, CA (US); Dilip Singh, Burbank, CA (US); Mayur Srinivasan, Encino, CA (US)

(73) Assignee: FOX CORPORATION, New York, NY (US)

( * ) Notice: Subject to any disclaimer, the term of this patent is extended or adjusted under 35 U.S.C. 154(b) by 182 days.

(21) Appl. No.: 17/104,259

(22) Filed: Nov. 25, 2020

(65) Prior Publication Data
US 2021/0160548 A1    May 27, 2021

Related U.S. Application Data

(60) Provisional application No. 62/940,710, filed on Nov. 26, 2019.

(51) Int. Cl.
| | | |
|---|---|---|
| *H04N 21/2187* | (2011.01) | |
| *H04N 21/2365* | (2011.01) | |
| *H04L 65/61* | (2022.01) | |
| *H04L 65/65* | (2022.01) | |

(52) U.S. Cl.
CPC ......... *H04N 21/2187* (2013.01); *H04L 65/61* (2022.05); *H04L 65/65* (2022.05); *H04N 21/2365* (2013.01)

(58) Field of Classification Search
CPC ............ H04N 21/2187; H04N 21/2365; H04L 65/61; H04L 65/65
See application file for complete search history.

(56) References Cited

U.S. PATENT DOCUMENTS

| | | | |
|---|---|---|---|
| 8,819,476 B2 | 8/2014 | Roth et al. | |
| 10,069,885 B2 | 9/2018 | Dasher et al. | |
| 2011/0083037 A1* | 4/2011 | Bocharov | H04L 65/80 714/4.11 |
| 2011/0161723 A1 | 6/2011 | Taleck et al. | |
| 2015/0312302 A1* | 10/2015 | Gupta | H04L 67/561 709/219 |
| 2018/0069950 A1 | 3/2018 | Eswaran et al. | |
| 2019/0132194 A1* | 5/2019 | Joshi | H04L 41/0846 |
| 2019/0166178 A1* | 5/2019 | Beheydt | H04L 65/65 |

OTHER PUBLICATIONS

International Application No. PCT/US2020/062207 International Search Report and Written Opinion dated Mar. 19, 2021, 6 pages.

* cited by examiner

*Primary Examiner* — Kyu Chae
(74) *Attorney, Agent, or Firm* — CANTOR COLBURN LLP

(57) ABSTRACT

Systems and methods for live stream control, including disaster recovery and/or load balancing, are provided including a first video encoding and distribution platform as a primary platform, a second video encoding and distribution platform running in parallel to the primary platform as a secondary platform, which secondary platform uses separate video transmission, independent video encoding, video packing, manifest generation, and an alternate content delivery network (CDN), and an application or module configured to direct playback requests to the primary or secondary platform, dependent upon an operational status of the primary platform.

20 Claims, 4 Drawing Sheets

SYSTEM AND METHOD FOR LIVE STREAM CONTROL

CROSS-REFERENCE TO RELATED APPLICATION

This application claims the benefit of priority to U.S. Provisional Application No. 62/940,710 filed Nov. 26, 2019, the disclosure of which is incorporated herein by reference in its entirety.

FIELD

The present technology is generally related to media streaming, including over the top (OTT) live video streaming, and more particularly to rapid recovery for live streaming control during outages and/or for improved load balancing.

BACKGROUND

One primary issue with live streaming services includes outages. Customers often find frustration with streaming services, including and often with particular regard to OTT live video streaming, when such streaming is interrupted due to some kind of outage. The outage can be only momentary, or can be protracted, and can significantly impact a viewer's ability to watch programming In many instances, a content provider utilizes third party partners to handle encoding and streaming of OTT live video through various applications. Because these third party systems are external, turn-key solutions, when they suffer outages, there is little the content provider can do to restore user access to the service until the third party can mitigate their issues.

This is particularly problematic during high traffic events (e.g., World Cup, World Series, Super Bowl, Election Coverage, and other high profile events) where even a few seconds of a video outage could result in millions of users losing the ability to watch programming This results in upset consumers, lost revenues to the content provider, and bad press for the content provider and platform as a whole.

What is needed in the art are systems and methods that provide for recovery for such outages (also referred to herein with regard to various embodiments as "live stream disaster") and/or for improved load balancing in a manner that avoids the problems described above.

SUMMARY

The techniques of this disclosure generally relate to systems and methods for live stream control for disaster recovery and/or improved load balancing.

In one aspect, the present disclosure provides a first video encoding and distribution platform as a primary platform, and a second video encoding and distribution platform running in parallel to the primary platform as a disaster recovery (DR) platform, also referred to with regard to various embodiments herein as a "DR video stack", "DR stream", "DR service", etc. In exemplary embodiments, the DR platform is a simplified version of the primary live streaming technology stack, which uses separate video transmission, independent video encoding, video packing, manifest generation, and alternate content delivery networks (CDNs).

In another aspect, the disclosure provides a system and method for continued viewing of a consumer-selected media program during catastrophic failure (such that video streams become at some point inaccessible to viewers) of a primary video platform. In exemplary embodiments, the system is configured to rapidly (or in some embodiments, immediately) direct new playback results to the alternate DR video stack. Additionally, in embodiments where the DR platform is simplified relative to the primary platform, major potential points of failure that can cause video playback to fail are further advantageously eliminated.

In another aspect, the system and method provides for a module or application (also referred herein as a "stream director") running on a processor that determines whether playback requests should be directed to the primary stream or the DR stream. In exemplary embodiments, such determination is made in real time or near-real time with regard to each playback request.

In other aspects, the stream director selects which stack to use based on business rules, for example, one or more of capacity of the stack, availability, cost, etc. In further aspects the stream director also can select which CDN to use based on business rules (for example, user quality of experience, capacity, cost, etc.).

In other aspects, where multiple CDNs are utilized in a multi-CDN configuration, all or some of the CDNs may be shared across both the primary stack and the secondary (e.g., DR) stack.

In another aspect, the system and method provide a manual control for an operator, allowing such operator to fail-over to the DR service at any time (e.g., via a button on an interface, control center, etc.). In exemplary embodiments, the manual control causes the director service to immediately begin directing new playback requests to the alternate DR stack. Automatic or manual control may be provided to direct new traffic back to the primary video playback stack once service is restored.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

The techniques of this disclosure generally relate to systems and methods for live stream disaster recovery.

In one aspect, the present disclosure provides a first video encoding and distribution platform as a primary platform, and a second video encoding and distribution platform running in parallel to the primary platform as a disaster recovery (DR) platform, also referred to with regard to various embodiments herein as a "DR video stack", "DR stream", "DR service", etc. In exemplary embodiments, the DR platform is a simplified version of the primary live streaming technology stack, which version uses separate video transmission, independent video encoding, video packing, manifest generation, and alternate content delivery networks (CDNs).

In another aspect, the disclosure provides a system and method for continued viewing of a consumer-selected media program during catastrophic failure (such that video streams become at some point inaccessible to viewers) of a primary video platform. In exemplary embodiments, the system is configured to rapidly (or in some embodiments, immediately) direct new playback results to the alternate DR video stack. Additionally, in embodiments where the DR platform is simplified relative to the primary platform, major potential points of failure that can cause video playback to fail are further advantageously eliminated.

In another aspect, the system and method provides for a module or application (also referred herein as a "stream director") running on a processor that determines whether playback requests should be directed to the primary stream or the DR stream. In exemplary embodiments, such determination is made in real time or near-real time with regard to each playback request.

In other aspects, the stream director selects which stack to use based on business rules, for example, one or more of capacity of the stack, availability, cost, etc.

In other aspects, where multiple CDNs are utilized in a multi-CDN configuration, all or some of the CDNs may be shared across both the primary stack and the secondary (e.g., DR) stack.

In another aspect, the system and method provide a manual control for an operator, allowing such operator to fail-over to the DR service at any time (e.g., via a button on an interface, control center, etc.). In exemplary embodiments, the manual control causes the director service to immediately begin directing new playback requests to the alternate DR stack. Automatic or manual control may be provided to direct new traffic back to the primary video playback stack once service is restored. Additionally, automatic or manual control may be used to enable or disable manifest and segments from any of plural CDNs that could be used to deliver segments.

Figure 1:
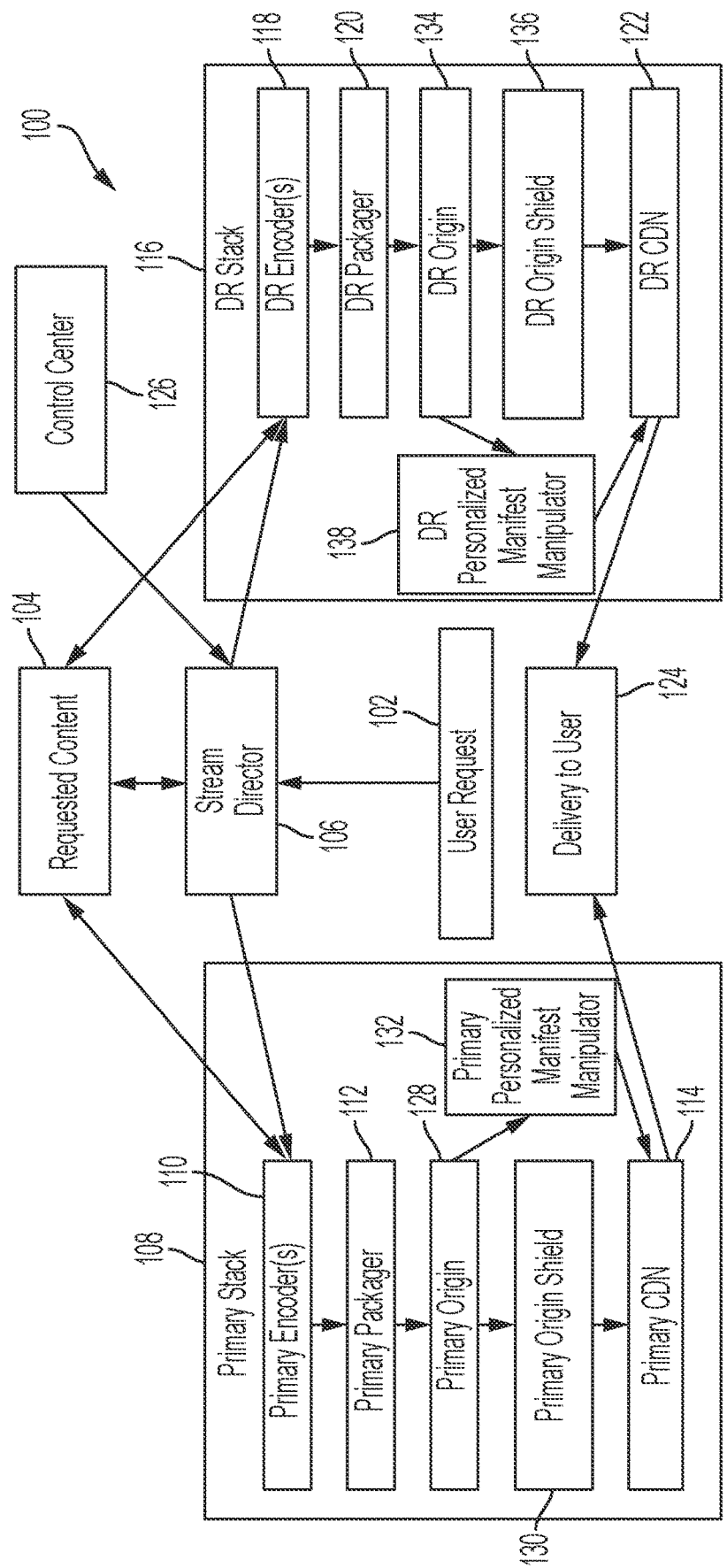
FIG. 1 is a block diagram that illustrates exemplary user requests for content through delivery of content via primary or DR video stacks.

Referring now to FIG. 1, an exemplary block diagram is illustrated generally at 100. The block diagram illustrates one exemplary architecture and one exemplary process flow, beginning with a user request (102) for content (at 104). The user request (102) is submitted as a playback request to a stream director (106), which (optionally) by default routes such requests for fulfilment at the primary stack (108) via one or more primary encoders (110), one or more primary packagers (112) (which may constitute separate components or modules), one or more primary origins (128), one or more primary origin shields (130), which acts as a cache for the primary origin (128), and a primary content distribution network (CDN) (114). We note that while FIG. 1 illustrates a packager, an origin and an origin shield, in exemplary embodiments, the packager(s), origin(s) and origin shield(s) may have redundant backups (for any given stack).

A manifest is generated from primary packager (112), provided via the primary origin (128), and is manipulated by the primary personalized manifest manipulator (132) for each user (e.g., inserting personalized advertisements, applying blackout policies, etc.), with the manifest linking back to video and audio segments stored and distributed by the primary CDN (114).

Referring still to FIG. 1, in the event that the primary stack (108) is experiencing an outage of some sort, or if use of an alternate stack is otherwise desirable, the stream director (106) routes new requests to the disaster recover (DR) stack (116), via one or more DR encoders (118), one or more DR packagers (120) (which may constitute separate components or modules), one or more DR origins (134), one or more DR origin shields (136), which acts as a cache for the DR origin (134), and a DR content distribution network (CDN) (122).

A manifest is generated from DR packager (120), provided via the DR origin (134), and is manipulated by the DR personalized manifest manipulator (138) for each user (e.g., inserting personalized advertisements, applying blackout policies, etc.), with the manifest linking back to video and audio segments stored and distributed by the DR CDNs (122).

Delivery to the user (124) occurs either via the primary CDN (114), should the primary stack be operating such that it can fulfill the request, or via the (separate) DR CDN (122), should an outage prevent proper delivery of content via the primary stack (108).

While the above is described with reference to a single CDN per stack, it should be recognized that multiple CDNs may be associated with either stack, which automatic or selected sharing of CDNs across both stacks. Three exemplary alternative CDN scenarios follow:

In an exemplary embodiment, a single CDN is selected by the stream director (106) at the time playback starts, with that CDN used for the entire playback session.

As was noted above, a control center (126) or the like provides operator controls allowing activation or deactivation of flow paths through the primary or DR/secondary stacks, as desired, among other features. With reference to the exemplary UI, shown generally at 200 in FIG. 2, the control center may also provide monitoring information related to the health of the system and individual encoders, availability of alternate (e.g., disaster recovery) stream options, etc. Information about individual encoders/streams may also be presented, e.g., activity, duration, real-time thumbnail images of the video, whether a backup DR encoder is available and/or active for a channel/feed, numbers of viewers, hardware and network statistics and health, errors or discrepancies, etc.

Figure 2:
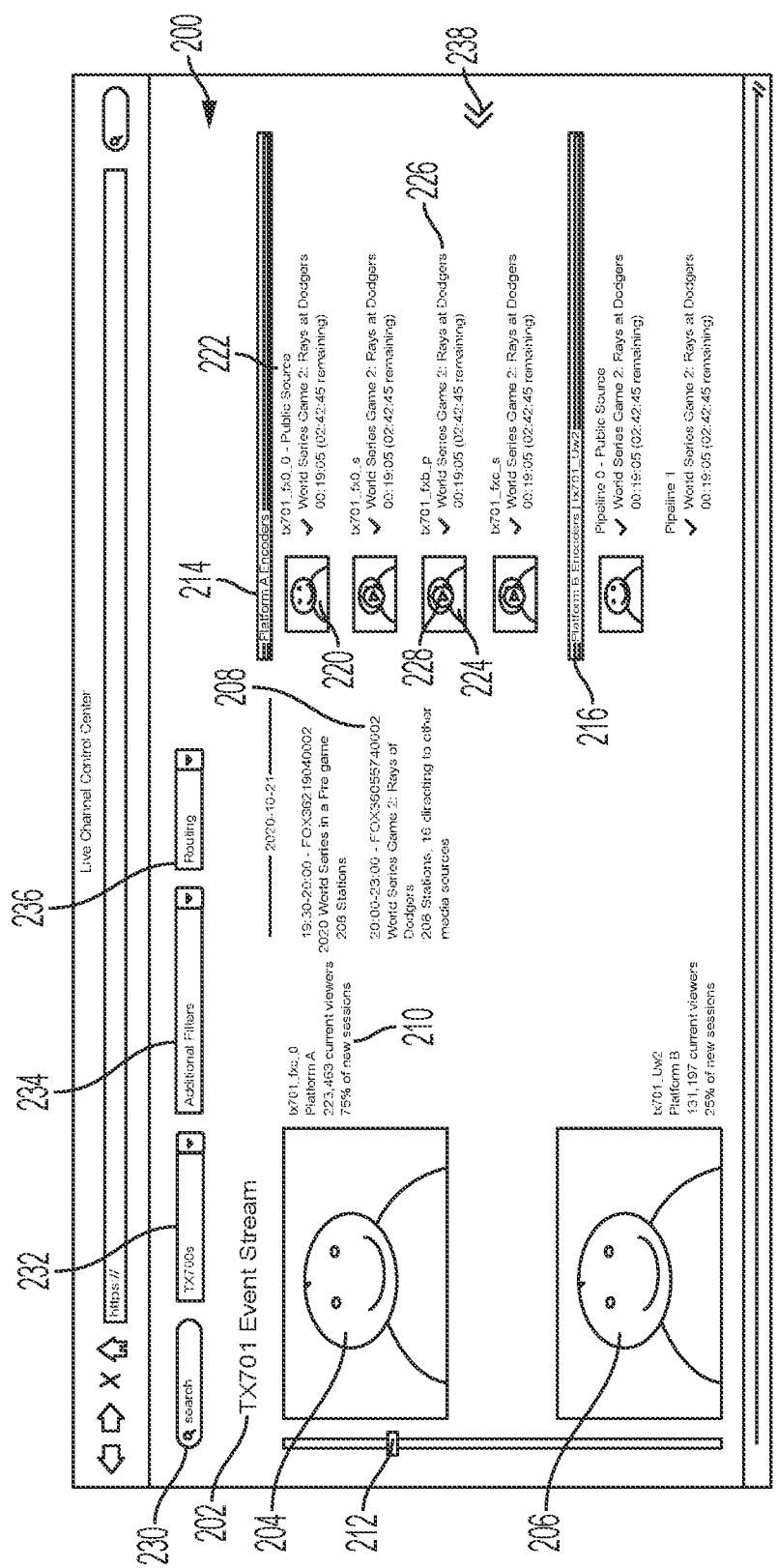
FIG. 2 is an exemplary user interface (UI) for a live channel control center.

Referring to the exemplary control center UI 200 of FIG. 2, a TV event stream 202 is shown in two separate stacks, as Platform A (shown at 204) and Platform B (shown at 206). Event stream information is generally shown at 208, for example with date, times, event names, numbers of stations, indication of directions to other media sources, etc.

Additionally, for each stack, information is shown generally at 210, showing for example, an identifier for the stack/platform, numbers of current viewers and a percentage of new sessions assigned to that stack, platform. An exemplary slider 212 is also illustrated, configured to adjust the ration of new viewers between Platforms A and B. In the current illustrated embodiment, Platform A accounts for 75% of new sessions (with 223,483 current viewers); and Platform B accounts for 25% of new sessions (with 131,197 current viewers).

Various Platform A encoders are shown generally at 214; and various Platform B encoders are shown generally at 216. The first encoder for the Platform A encoders 218 includes an image or icon 220 and description 222. This encoder represents the primary encoder currently being used as the source for Platform A. The text is also bolded and indicates that it is the "Public Source." In the illustrated embodiment, the text also indicates the event name, elapsed time and time remaining Additional encoder(s) are provided below the "Public Source" encoder in the relevant Platform/stack listing, each with an image, e.g., 224 and text, e.g., 226. These additional encoders also have a play button 228 within the image 224, the play button configured to allow for switching of the source for a given platform to a new encoder. For example, such play button 228 may appear during a mouse over of the interface that when clicked, causes that platform to switch its source to the newly selected encoder.

FIG. 2 also shows a UI search area 230, an event selection drop down tab 232, an "Additional Filters" drop down tab 234, a "Routing" drop down tab 236 and a side panel arrow 238, which opens a side panel with additional controls.

Figure 3:
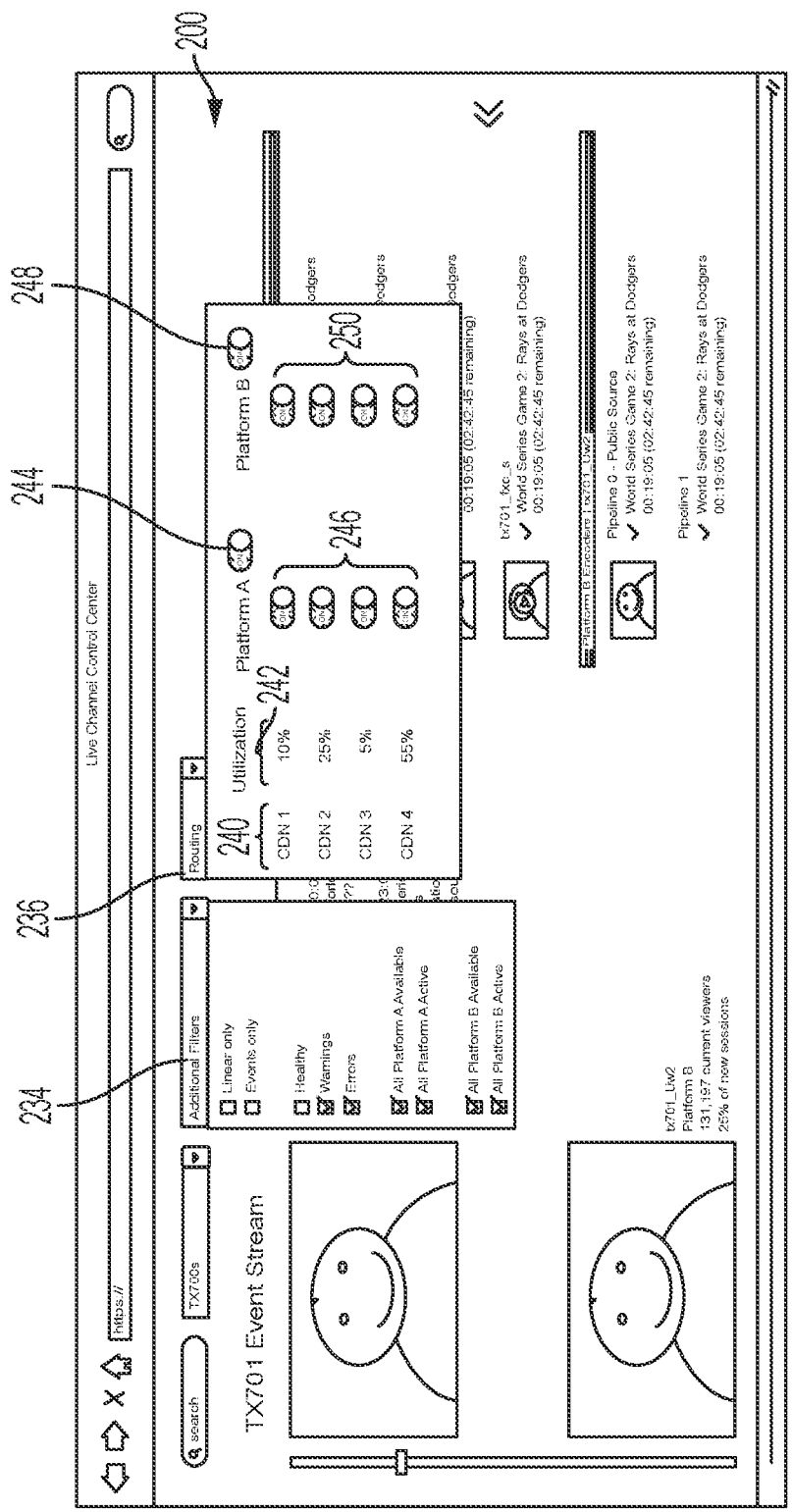
FIG. 3 is a further image of the UI of FIG. 2 showing expanded selectable features.

FIG. 3 shows the user interface of FIG. 2, with expanded "Additional Filters" drop down tab 234 and with expanded "Routing" drop down tab 236. Illustrated additional filtering options for display of encoders include: Linear only; Events only; Healthy; Warnings; Errors; All Platform A Available; All Platform A Active; All Platform B Available; and All Platform B Active.

The illustrated Routing drop down tab 236 provides an indication of one or more CDNs (shown generally at 240), corresponding indications of utilization (shown generally at 242), an on/off selector for all of Platform A 244, individual CDN on/off selectors for Platform A 246, an on/off selector for all of Platform B 248, and individual CDN on/off selectors for Platform B 250.

Additional exemplary control center features includes provision for operational status alarms or alerts, including visual alarms, audible alarms, notification of operational personnel at the control panel, in distributed lists, e.g., email lists, messaging/text lists, paging (e.g., Slack or Pager Duty) etc., or otherwise. Alerting may be based on severity, e.g.: critical alerts, which will directly impact the viewing experience in the stream in a significant way or with a large number of viewers; warnings, which indicate an issue that impacts the viewing experience, but in a less than critical way or impacting only a small number of users; and informational alerts, which don't impact the user experience of the stream but are not behaving as expected or may be offline.

In further exemplary embodiments, when the control center or stream director detects a potential issue, it may not be impacting all encoders associated with the media source. In such cases, the system can automatically switch which encoder is feeding the public stream to users or re-route/load balance the traffic to an alternate version of the stream that is healthy (e.g., to a DR stream). In such cases, alerting can inform operators of what the detected issue was, what automated failover action was taken, and how long it took between when the issue was detected and when it was resolved.

Figure 4:
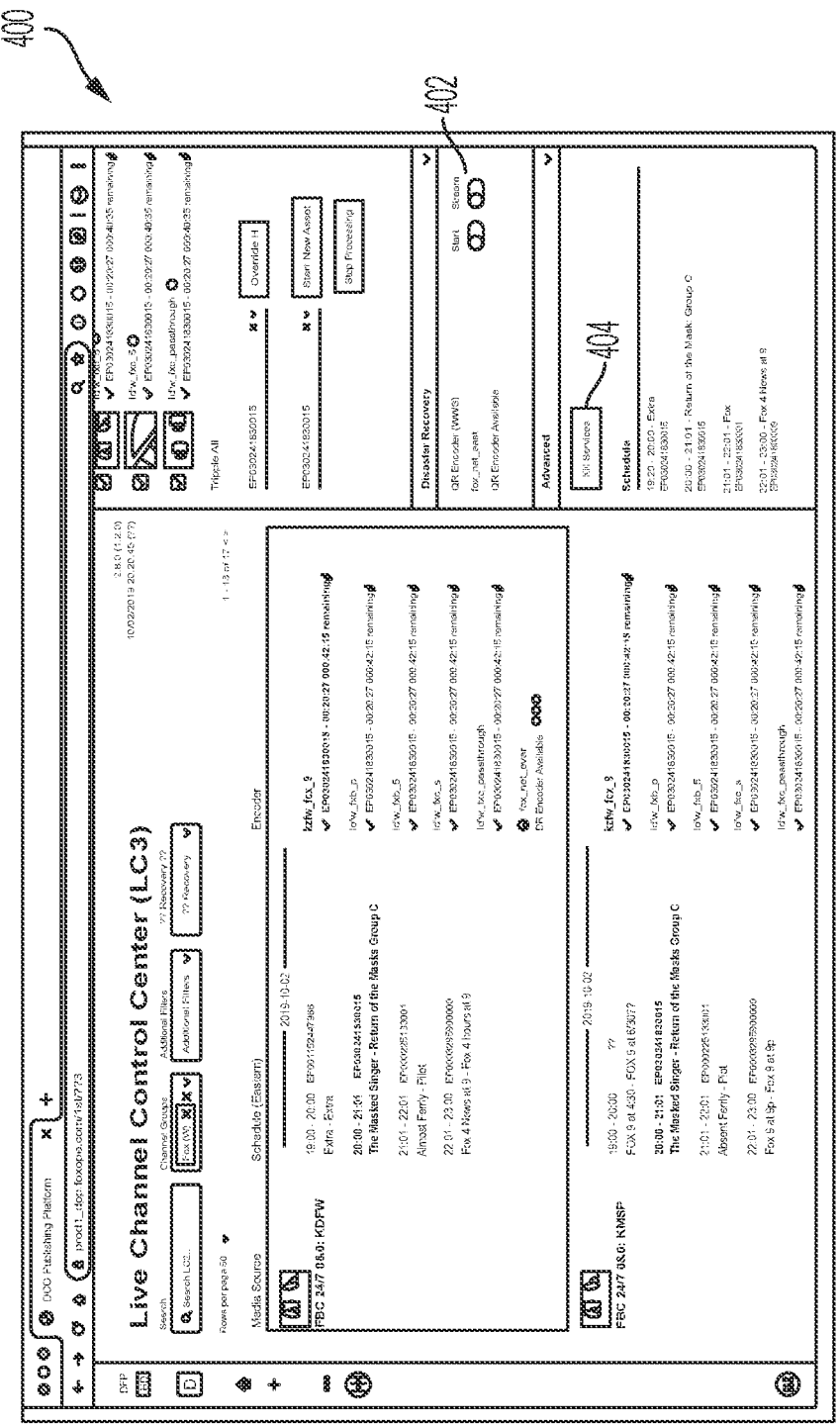
FIG. 4 is another exemplary UI for a live channel control center.

Further exemplary embodiments include a control center as a web-based user interface (UI) that allows OTT live content operators to monitor the health of all the live stream encoders, ensure the accuracy of the data in the streams, and manually take control of the encoders when the automation systems do something that is undesirable. With reference to FIG. 4, which shows an exemplary control center generally at 400, other exemplary manual control aspects include: manually failover the channel to an alternate encoder in a pool; update a material ID (which identifies what program is currently in the channel); start a new program channel with predefined slates (e.g., "the start of your programming has been delayed"); kill all active sessions on the channel (end the stream for all viewers) (see 404 in FIG. 4); access detailed logs of encoder behavior; access an audit log of when operators have manually overridden encoder or media source behavior; change DAI configuration for the currently encoded program or upcoming programming; shift viewers joining the stream (or already in the stream) between different versions of the stream to manage load and reliability (e.g., between primary and disaster recovery streams (see 402 in FIG. 4)).

FIG. 1 illustrates an exemplary, parallel arrangement of primary and DR stacks. We note that disaster recovery is a contemplated embodiment, though the impetus for switching or load balancing between stacks need not be based on a "disaster", for example with reference to FIG. 2, which permits load balancing between stacks/platforms. In such examples, other considerations may be presented or used in order to provide additional functionality, such as automatic or manual control to enable or disable segments from any of plural CDNs that could be used to deliver segments. In further aspects the stream director also can select further, selection of which CDN to use based on business rules (for example, user quality of experience, capacity, cost, etc.). CDN quality of service may be monitored by measuring download time and rebuffering ratios for internet users at various locations and making a determination at the start of playback which CDN will provide the best and most cost effective experience for users.

In further exemplary embodiments, to increase reliability and availability of a DR solution, the DR stack represents, in execution, a simplification relative to the primary/production stack to remove components that add complexity and potential areas for failure. For example, the DR stack may act as a linear, pass-through stream, with certain major components removed that can be the cause of instability in the stream. Exemplary removed components for the DR stack include, but are not limited to: selectable or built in aspects of SCTE35 automation; user sessions; viewing analytics; and monetization.

SCTE35 is a technology that enables program level viewing analytics and digital ad insertion in live streams. While the primary stack (108) will benefit from that or a similar technology for analytics and digital ad insertion, removal of such components for the DR stack can provide benefit with regard to reliability and availability of the DR stack as a solution. In exemplary embodiments, aspects of SCTE35 (or similar technology) may be enabled or disabled, for example disabling the processing of SCTE35 messages, manipulation of the encoder and the assets it generates based on the SCTE35 messages, etc., for a particular stream to either support richer features or simplification for reliability.

Additionally, the exemplary removal from the DR platform of the ability to create unique sessions for each user (consequently removing the ability to track in real-time concurrent viewers of each DR stream server-side) additionally simplifies the DR stack (108) and increases reliability/availability of the solution. While server-side analytics may not be available, client-side analytics can be used in this scenario to track concurrent viewers in the stream.

Another exemplary area for simplification of the DR stack (108) includes removal of dynamic ad insertion from DR streams. This reduces multiple points of failure associated with the integration of ad server decisioning and encoding systems. As a result of this, when users are in a DR stream with dynamic ad insertion disabled, monetization of the stream is still possible through other techniques, for example Nielsen audio watermarking such as DTVR (pass-through), even though the ability to insert unique ads for each user session, affiliate specific inventory (when in use for a national stream serving multiple local affiliates) and MVPD specific inventory, is unavailable. As with SCTE35, in exemplary embodiments, dynamic ad insertion/individual user sessions may be enabled or disabled for a particular stream to either support richer features or simplification for reliability. Other exemplary techniques for simplifying a DR stream and reducing points of failure include removing authorization, i.e., ungating, in a stream.

In exemplary embodiments, the infrastructure associated with the DR platform can be configured for only occasional use rather than being active 24 hours per day. One additional advantage for this includes a reduction in operational costs for the DR platform. In exemplary embodiments in such a scenario, the DR platform can be kept in an offline status, with use of cloud-based computing such that costs are only incurred when the platform is active. For anticipated high traffic events, individual DR streams may be activated before such high traffic events, so that instant cut-over to the DR streams is possible when necessary. Additionally, the entire DR platform can be started in less than two minutes if the primary streaming platform were to suffer an outage during a lower-traffic time when the DR platform was not already active.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, media distribution.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

What is claimed is:

1. A method for live stream disaster recovery, comprising:
   routing a first user request for media content to a first video encoding and distribution platform as a primary platform, the primary platform including, for primary video transmission: primary video encoding, video packing, manifest generation and content delivery network (CDN) components;
   determining an operational status of the primary platform;
   if the operational status of the primary platform positively indicates the ability to deliver streamed content, continuing to route subsequent user requests for media content to the primary platform;
   if the operational status of the primary platform negatively indicates the ability to deliver streamed content, routing subsequent user requests for media content to a second video encoding and distribution platform running in parallel to the primary platform as a disaster recovery (DR) platform, which uses separate video transmission and includes independent DR video encoding, video packing, manifest generation, and content delivery network (CDN) components.

2. A method in accordance with claim 1, wherein determining and direction of user requests to the primary platform or to the disaster recovery (DR) platform is performed by an application or module.

3. A method in accordance with claim 2, wherein the application or module periodically determines an operational status of the primary platform.

4. A method in accordance with claim 2, wherein the application or module continually determines an operational status of the primary platform.

5. A method in accordance with claim 1, wherein the secondary platform is simplified with regard to the primary platform.

6. A method in accordance with claim 5, wherein the primary platform includes, and the secondary platform does not include, one or more of: SCTE35 automation; user sessions; viewing analytics; and monetization.

7. A method in accordance with claim 2, wherein the secondary platform is maintained offline, using cloud-based computing.

8. A method in accordance with claim 7, wherein the secondary platform is configured to activate in less than two minutes.

9. A method in accordance with claim 2, wherein one or more individual secondary platform streams is active, while the remainder of the secondary platform is maintained offline.

10. A method in accordance with claim 2, further comprising providing a control center providing manual control for the secondary platform and for selection of platforms and streams.

11. A method in accordance with claim 2, wherein an operational status of the primary platform comprises at least partial failure of the primary platform.

12. A method in accordance with claim 2, wherein an operational status of the primary platform and an operational status of the secondary platform are considered when determining when and how much traffic to direct to each platform.

13. A method in accordance with claim 2, further comprising providing a user interface configured to selectively load new sessions with regard to the primary and secondary platforms.

14. A method in accordance with claim 13, wherein the user interface includes a slider that allows more or less percentage of new sessions to be directed to the primary or secondary platforms.

15. A method in accordance with claim 2, wherein the application or module configured to direct playback requests utilizes decisioning logic to direct amounts of new sessions to the primary and secondary platforms.

16. A method in accordance with claim 15, wherein the decisioning logic factors in one or more of: capacity, availability and cost.

17. A method in accordance with claim 2, wherein the control center is configured to provide multiple selectable CDNs for use across both or either of the primary and secondary platforms.

18. A method in accordance with claim 17, wherein CDN selection is provided using decisioning logic automatically, adapting which CDNs are utilized for each client in near real-time.

19. A method in accordance with claim 17, wherein CDN selection is provided using decisioning logic automatically, taking into account on or more of:
   user quality of experience, capacity and cost.

20. A method in accordance with claim 2, wherein each of the first and secondary platforms includes plural available encoders as alternate encoders, with alternate encoders selectable in a user interface for each of the first and secondary platforms.

\* \* \* \* \*